(12) United States Patent
Cook

(10) Patent No.: US 12,710,294 B2
(45) **Date of Patent: *Aug. 18, 2026**

(54) MODULAR AMI/AMR IN-GROUND METER BOX

(71) Applicant: NICOR, INC., Dripping Springs, TX (US)

(72) Inventor: Jeffrey A. Cook, Dripping Springs, TX (US)

(73) Assignee: Nicor, Inc., Dripping Springs, TX (US)

( * ) Notice: Subject to any disclaimer, the term of this patent is extended or adjusted under 35 U.S.C. 154(b) by 288 days.

This patent is subject to a terminal disclaimer.

(21) Appl. No.: 18/443,856

(22) Filed: Feb. 16, 2024

(65) Prior Publication Data

US 2024/0183693 A1 Jun. 6, 2024

Related U.S. Application Data

(63) Continuation-in-part of application No. 17/248,740, filed on Feb. 5, 2021, now Pat. No. 11,940,468.

(60) Provisional application No. 63/009,870, filed on Apr. 14, 2020.

(51) Int. Cl.
*G01D 11/24* (2006.01)
*G01D 11/16* (2006.01)

(52) U.S. Cl.
CPC ............. *G01D 11/24* (2013.01); *G01D 11/16* (2013.01)

(58) Field of Classification Search
CPC ........ G01D 11/00; G01D 11/24; G01R 11/00; G01R 11/02; G01R 11/04; G01R 22/00; G01R 22/06; G01R 22/061; G01R 22/063
See application file for complete search history.

(56) References Cited

U.S. PATENT DOCUMENTS 4,669,305 A * 6/1987 Rivero-Olmedo ...... G01F 15/18 73/201
5,823,577 A * 10/1998 Johnston ................ G01F 15/18 73/201
6,414,605 B1 7/2002 Walden et al.
6,749,080 B1 6/2004 White et al.
7,360,553 B1 4/2008 Ismert et al.
(Continued)

FOREIGN PATENT DOCUMENTS

CN 203433020 U 2/2014
CN 105823915 A 8/2016
(Continued)

*Primary Examiner* — Huy Q Phan
*Assistant Examiner* — David B Frederiksen
(74) *Attorney, Agent, or Firm* — Robinson + Cole LLP

(57) ABSTRACT

An AMI/AMR in-ground meter box, including first and second side panels, each having an interior side and an exterior side; and first and second end panels, each having an interior side and an exterior side; wherein each of said side panels and end panels include a generally rectangular planar portion having a top edge, a bottom edge, a first interlocking end having a plurality of male elements and female slots, an arcuate second end having a 90-degree bend which forms a corner of the assembled meter box and terminating in an interlocking end having a plurality of male elements and female slots configured to interlock with paired male elements and female slots in said first interlocking end and with an improved adjustable bracket channel assembly for interior support.

19 Claims, 7 Drawing Sheets

(56) References Cited

U.S. PATENT DOCUMENTS

| | | | | |
|---|---|---|---|---|
| 2003/0061974 | A1 | 4/2003 | Smyers et al. | |
| 2004/0200833 | A1 | 10/2004 | Dubois et al. | |
| 2007/0017916 | A1 | 1/2007 | Sabanci et al. | |
| 2008/0150750 | A1* | 6/2008 | Parris | G01D 11/245 73/201 |
| 2008/0238711 | A1 | 10/2008 | Payne et al. | |
| 2009/0145917 | A1 | 6/2009 | Wojcik et al. | |
| 2009/0173397 | A1 | 7/2009 | Mallela et al. | |
| 2009/0212049 | A1 | 8/2009 | Anhel et al. | |
| 2009/0277910 | A1 | 11/2009 | Buttz et al. | |
| 2011/0006182 | A1* | 1/2011 | Hockema | H01Q 1/00 248/224.8 |
| 2015/0276454 | A1* | 10/2015 | Laursen | G01D 11/24 73/201 |
| 2017/0364734 | A1* | 12/2017 | Melugin | G01D 4/008 |
| 2019/0260106 | A1* | 8/2019 | Padron | H01Q 1/2233 |
| 2020/0308811 | A1 | 10/2020 | Brown et al. | |

FOREIGN PATENT DOCUMENTS

| | | | |
|---|---|---|---|
| CN | 106976626 | A | 7/2017 |
| CN | 110316484 | A | 10/2019 |
| CN | 209570122 | U | 11/2019 |
| TW | M276808 | U | 10/2005 |

* cited by examiner 12
46
48
56
50
60
28b
52
54
18
28b
28a
66
44
68
66
14
42
26
28
40
52
28b
44
22
36
20
24
38
32
34a
30
34
16
34a
34
68

28b
20
18
70
44
36

28
42
62
66
18
70
44
64
68

66
34a
34
24

MODULAR AMI/AMR IN-GROUND METER BOX

CROSS REFERENCE TO RELATED APPLICATIONS

This application relates to, and claims priority as a continuation-in-part (CIP) from U.S. Ser. No. 17/248,740 filed Feb. 5, 2021, the entire contents of which are incorporated herein by reference; and which in turn claims priority from U.S. Ser. No. 63/009,870 filed Apr. 14, 2020, the entire contents of which are also incorporated herein by reference.

FIGURE SELECTED FOR PUBLICATION

FIG. 6.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

SEQUENCE LISTING

Not applicable.

BACKGROUND OF THE INVENTION

Field of the Invention

The present invention relates generally to in-ground utility meter boxes, for AMI/AMR meters in AMI/AMR networks, and more specifically to an underground utility meter pit box or meter box for suspending an automatic meter reader antenna below the meter pit lid, the meter box having side and end panels joined in end-to-end interlocking joints with an adjustable mouse hole for incoming pipes, a snap-on gopher panel, and surface ribbing to prevent box migration. The box is configured to increase in strength as differential forces urge side panels in various directions.

Description of the Related Art

Automatic meter readers (AMRs) and Advanced Metering Infrastructure meters (AMI) are well known for tracking residential and commercial utility use. AMR/AMI transmitters are connected to the utility meter, where the meter and transmitter are installed in subsurface (in-ground) pit box or meter box for measuring water, electric, or gas service and communicating the measurements to technicians who poll the AMR/AMI from a handheld device or directly to the utility provider through signals transmitted to nearby cell service towers and forwarded to the service provider.

In most installations, the utility meter box is designed as a subsurface (recessed) container to be buried below ground level. The meter box is covered with a secure lid that protects the meter from water, debris, foot and vehicular traffic, weather, electrostatic charges, and unauthorized access (to prevent tampering and vandalism).

Conventional pit boxes are cylindrical or cuboid, the former bulky for transport and shipment, the latter generally having side joints that compromise strength and allow for independent migration or movement under the profound forces imparted on the box from moving soils. The present invention provides resolves each shortcoming.

ASPECTS AND SUMMARY OF THE INVENTION

The present invention is an improved in-ground AMR/AMI meter box configured with side and end panels joined with end-to-end interlocking joints which increase box strength when subjected to external loads. Every force impinging on the box to put joined components in tension and that might pull it apart under tension simultaneously impart offsetting compressive force that actually increase joint strength. It is therefore a remarkably robust assembly.

The meter box is also configured with external surface features, such as ribbing, that increases panel strength and resists lateral movement of the panels. It includes adjustably sized, arched guillotine door slidably disposed over mouse holes for fitting utility pipes or conduit (water, electric, gas) disposed through the box for operational connection to an installed utility meter.

Importantly, the pit box is collapsible and then nestable in a stacked configuration for compact and easy transport.

According to one aspect of the present invention, there is provided an AMI/AMR in-ground meter box, including first and second side panels, each having an interior side and an exterior side; and first and second end panels, each having an interior side and an exterior side; wherein each of said side panels and end panels include a generally rectangular planar portion having a top edge, a bottom edge, a first interlocking end having a plurality of male elements and female slots, an arcuate second end having a 90-degree bend which forms a corner of the assembled meter box and terminating in an interlocking end having a plurality of male elements and female slots configured to interlock with paired male elements and female slots in said first interlocking end and with an improved adjustable bracket channel assembly for interior support.

According to another aspect of the present invention, there is provided an AMI/AMR in-ground meter box assembly, wherein: said at least first adjustable bracket channel assembly includes a channel member defining a slidable channel and an adjustable bracket member having a free support first end and a support second end removably and adjustable retained within said slidable channel.

According to another aspect of the present invention, there is provided an AMI/AMR in-ground meter box assembly, wherein: said channel member is mounted to said interior of said assembled meter box assembly and has an extending length along said slidable channel.

According to another aspect of the present invention, there is provided an AMI/AMR in-ground meter box assembly, wherein said free support end of said adjustable bracket member including a C-shaped member having an open side; and said open side facing away from said channel member.

According to another aspect of the present invention, there is provided an AMI/AMR in-ground meter box assembly, wherein: said support second end of said adjustable bracket member includes cross member having an engaging profile shaped for slidable engagement with said slidable channel of said channel member, whereby said support second is slidably adjustable along said extending length allowing a relative positioning of said free support end of said adjustable bracket member within said interior of said assembled meter box assembly.

These are only some of the more important features of the present invention. Other features characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

The above and other aspects, features and advantages of the present invention will become apparent from the following description read in conjunction with the accompanying drawings, in which like reference numerals designate the same elements.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
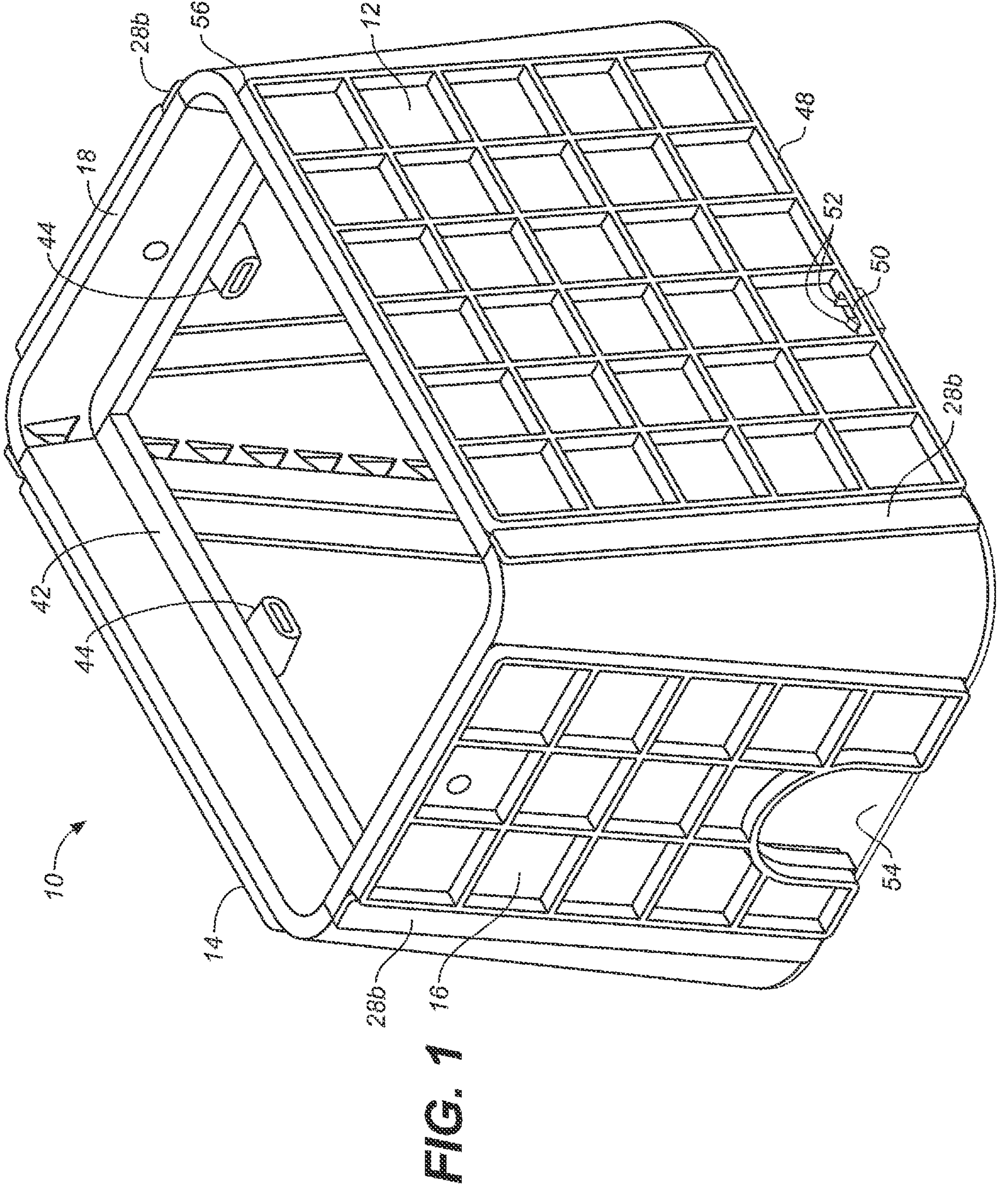
FIG. 1 is an upper perspective view of an embodiment of the modular AMR/AMI in-ground meter box of the present invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art.

Referring to FIGS. 1 through 5, wherein like reference numerals refer to like components in the various views, there is illustrated therein a new and improved modular AMR/AMI in-ground box for sub-grade installation, the invention generally denominated 10 herein.

Figure 2:
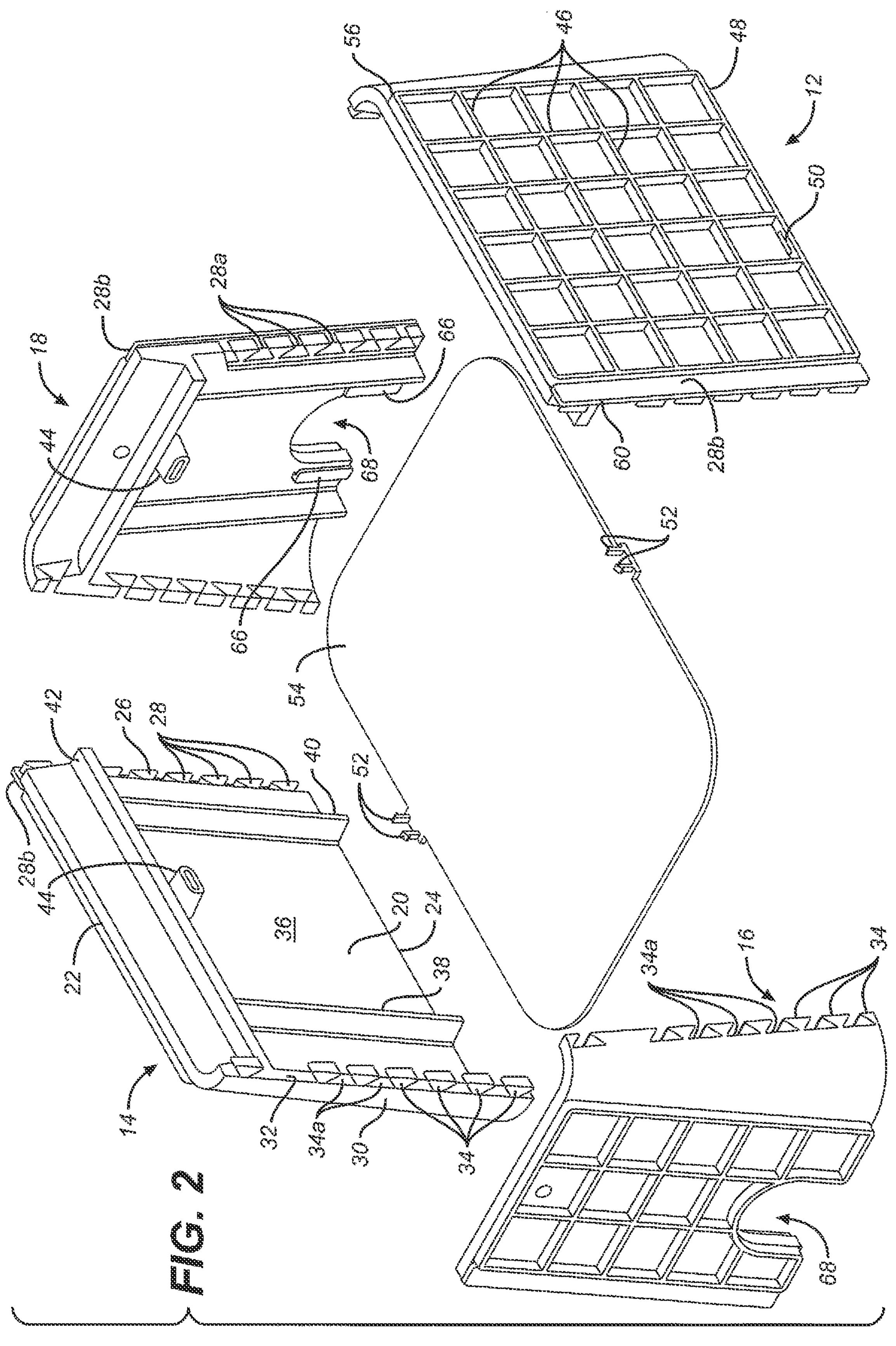
FIG. 2 is the same view showing the box disassembled.
Figure 3:
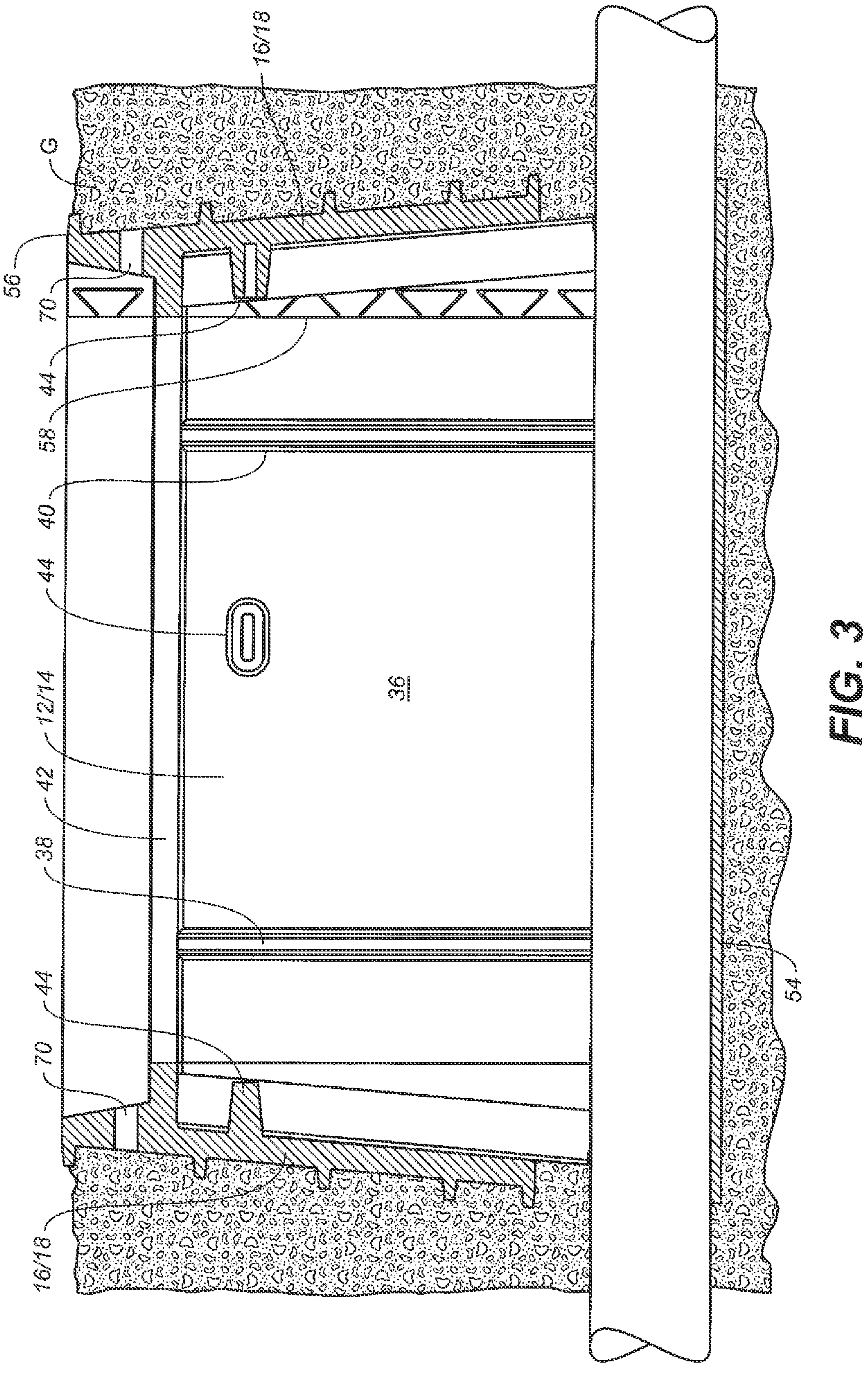
FIG. 3 is a cross-sectional end view in elevation showing the box installed underground with a pipe or conduit inserted through the end mouse holes schematic side view in elevation thereof.

FIG. 1 is a perspective view showing the box assembled and generally suited for in-ground installation. FIG. 2 is an exploded view thereof, showing the box includes substantially identical first and second side panels 12, 14, and substantially identical first and second end panels, 16, 18. Each of the side and end panels is fabricated using one of any of a number of suitable manufacturing processes designed for manufacturing optimization, such processes including 3D printing and CNC machining, and various thermoforming and thermosetting processes, including polymer casting, vacuum forming, injection molding, extrusion, glass filled epoxy settings, blow molding and in other suitable forms now known or developed in the future in the arts of thermoforming and thermosetting processes.

As can be seen in a review of the drawings, and looking at side panel 14 as an exemplary panel showing features common to all panels in the assembly, the side and end panels each include a generally rectangular planar portion 20 having a top horizontal edge 22, a bottom horizontal edge 24, and a first interlocking (half-blind) vertical edge 26 having a plurality of interlocking male elements, e.g., dovetails, pins or box-finger, 28, with respectively shaped receiving female sockets 28*a*, and a retaining rabbet strip 28*b* (concealing the interlocking elements on the outer side, i.e., the blind side). The opposing end 30 of the panel is arcuate and includes a 90-degree bend (which forms a corner of the assembled meter box) and terminates in an interlocking vertical edge 32 having a plurality of interlocking male elements 34 and female sockets 34*a* for end-to-end interlocking connection with the male and female elements (28, 28*a*) of an adjoining side or end panel.

Each side and end panel also includes a planar interior surface 36 with two vertically oriented interior ribs 38, 40 to increase structural rigidity. The vertical ribs support a horizontally disposed interior support ledge or flange 42 set below the top edge and which, when assembled, comprises a continuous and contiguous ledge on which a meter box lid may be securely placed.

It should be noted that the interlocking elements of the panel ends are shown as single lap (half-blind) dovetail elements—i.e., pins and tail sockets on a pin panel end, tails and pin sockets on a tail panel end—but those with skill will appreciate that digital fabrication technology enables interlocking joints in countless configurations, including fanciful jigsaw puzzle joints, shouldered dovetails, alternating double and triple dovetails, lapped dovetail, double lapped dovetail, shouldered alternating double and triple dovetails, hooked jigsaw halves, box joints, double jigsaw, gingko and gooseneck mortise and tenon, so on. The dovetails shown in the illustrated embodiment are elegant, exemplary, relatively easy to fabricate, and provide the structural integrity needed for the application, but they are a non-limiting embodiment.

Further, and still reciting features common to all panels, immediately below the ledge 42 on the interior side is a standoff 44 for connecting a bracket or other means for securing a communication system in its entirety and/or transmitter assembly or antenna to the meter box. As with other features thus far recited, standoffs are disposed on the interior side of each panel, side and end, though boxes adapted for particular meters and communications systems may include fewer or more standoffs according to system mounting requirements.

Still referring to FIG. 2, attention is directed to the first side panel 12, as this view clearly shows exterior surface features again common to all box panels. It is seen, for instance, that the rectangular planar portion 20 of the panel includes a grid of stiffening ribs 46, including horizontally-oriented and vertically-oriented ribs generally normal to one another, which combine to prevent out-of-plane distortions as well as migration in any direction when installed in ground. The lowermost rib 48 on the side panels includes a socket 50 for insertion of male snap fit elements 52 disposed on the upper side of a gopher panel 54.

The uppermost rib 56 of the panels is intended for positioning at about the level of surrounding ground G (see FIG. 3), where an interlocking end-to-end joint 58 can also be seen.

At the end of the planar rectangular portion, disposed in a vertical orientation, the rabbet strip may be integral or may comprise a discrete polymeric bar 60 welded across the pins and sockets of the interlocking elements, thereby making the joint in such an embodiment a half-blind dovetail (interlocking) end-to-end joint in assembly rather than a through dovetail joint.

Figures 4A, 4B:
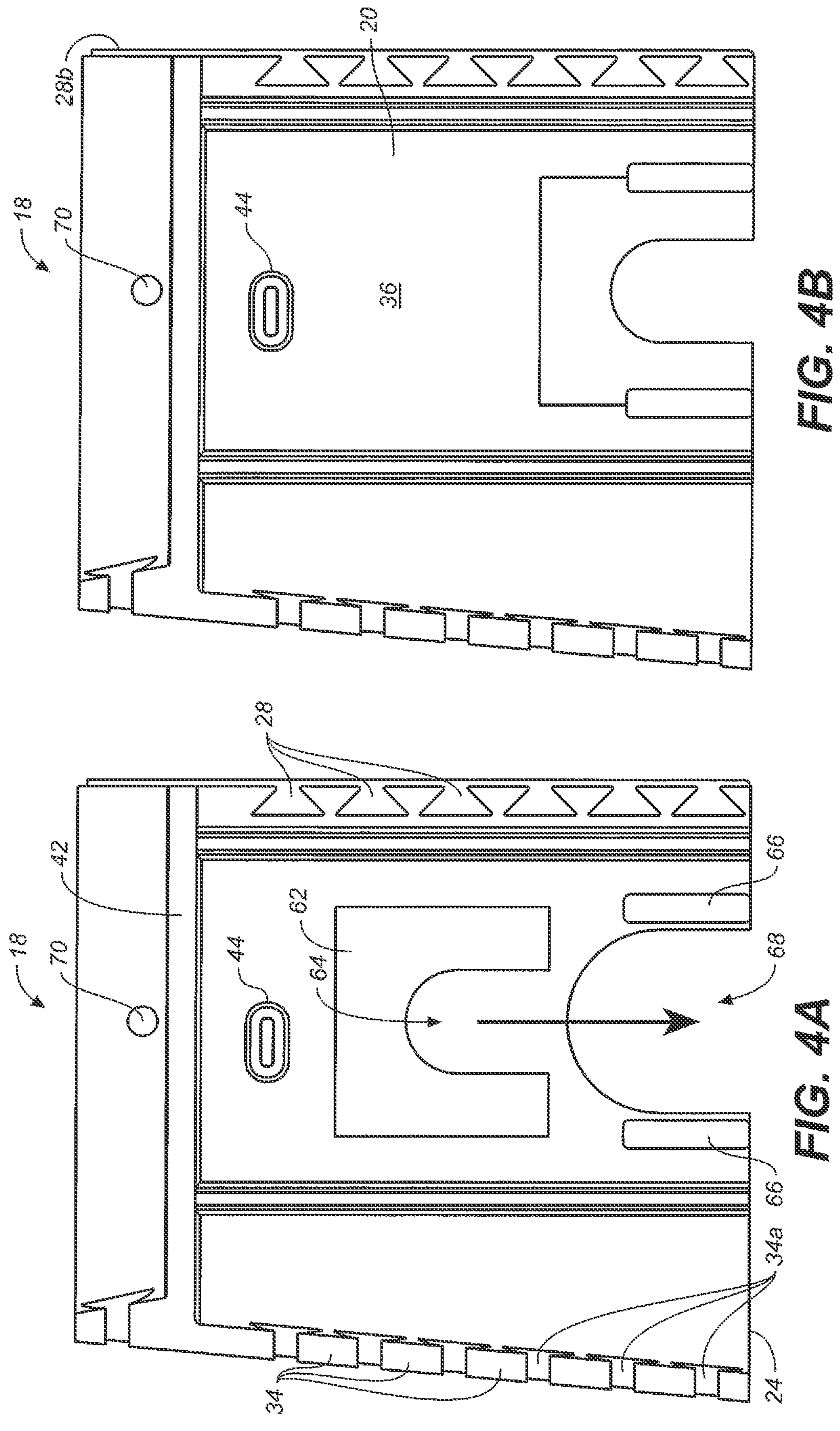
FIG. 4A is an end view in elevation of an interior portion of an end panel, featuring the guillotine door disposed above the mouse hole for is an upper perspective view showing the antenna bracket installed in a meter pit lid.
FIG. 4B is the same view with the door installed and lowered to adjust the mouse hole opening size.

Referring now to FIG. 2 and more particularly to FIG. 4, a few features are unique to the end panels, 18, 20. While relative dimensions of the end panels and side panels are non-limiting, in embodiments the end panels may comprise a smaller area than the side panels, making the assembly substantially a rectangular and having inwardly sloping sides from bottom to top—in essence a tapered cube with an inward taper from bottom to top. The end panels are intended to receive a utility supply pipe or conduit (electricity, water, gas), which inserts into one end and exits the other. To prevent the incursion of dirt into the box interior and to prevent small animals (e.g., moles, gophers, voles, mice, etc.) from taking up nests or inhabiting the box, a sliding guillotine door 62 is provided with an arched opening 64, the size of which is selected according to the size of the supply pipe or conduit so as to provide little clearance and thereby a secure enclosure. The door is inserted into slots defines by set off stiles or rails 66 alongside the arched opening 68 in the end panels. Disposed slightly above the ledge 42 for the lid is a hole 70 for installation of a spring lock to secure the lid (lock not shown). When assembled, embodiments of the meter box meet a 22,500 lb. ANSI Tier 15 load rating. This makes it ideally suited for use in highly trafficked environments where vehicles may inadvertently roll over the meter box.

Figure 5:
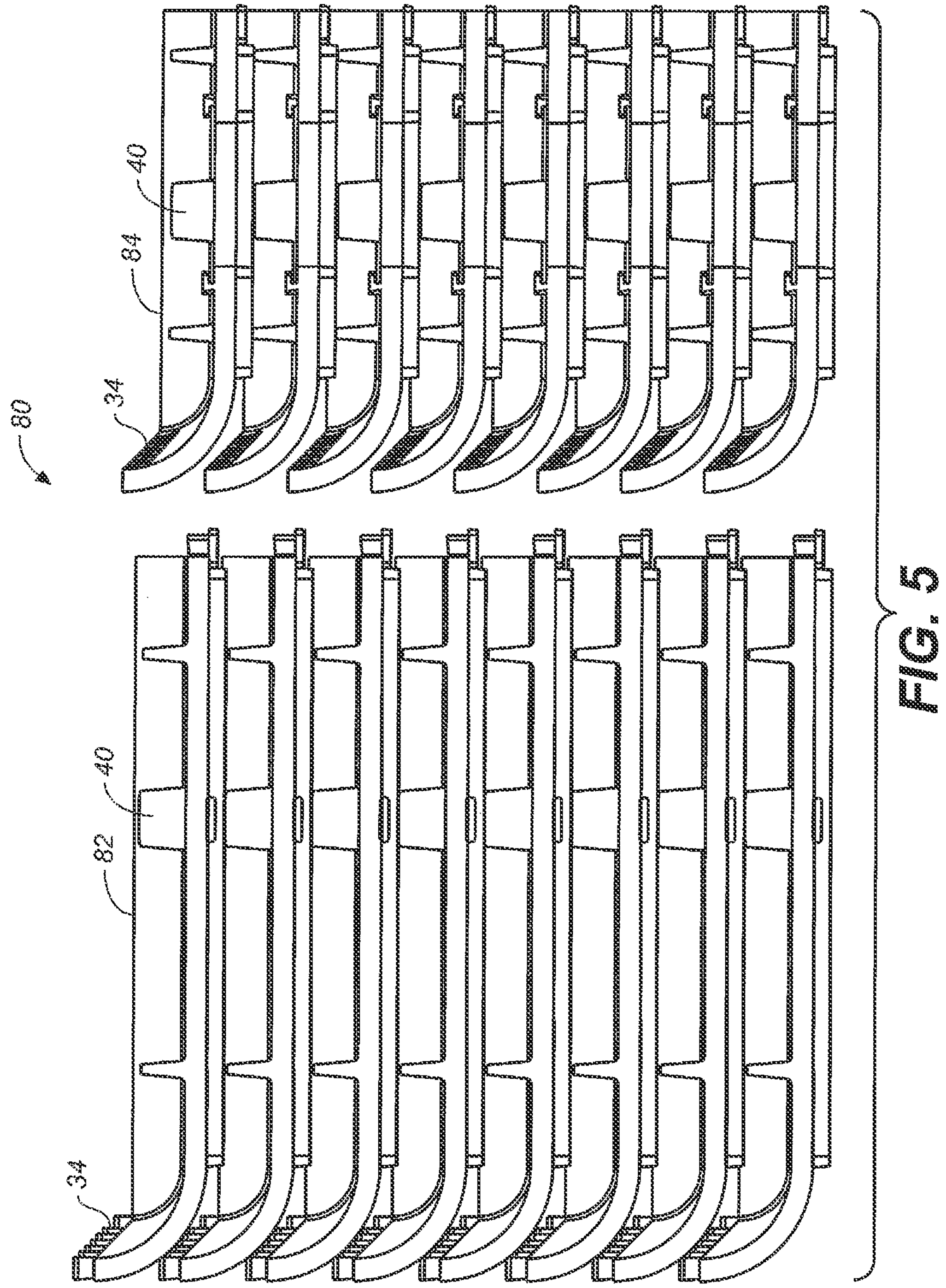
FIG. 5 is a side view in elevation of several dismantled in-ground boxes in a stacked in a nested configuration for shipping and transport.

Referring next to FIG. 5, there are shown a plurality of panels in a stacked and nested configuration 80 for shipment and storage, including a stack of side panels 82 and a stack of end panels 84. This view highlights a salient feature of the inventive meter box: viz., it is compact in storage and transport but strong in assembly with very few parts needed for effectively inseparable corner joints. Indeed, because the panels ship flat, the system enables shipment of 4.5 times as many units as conventional meter boxes. Assembly takes less than one minute in even unskilled hands.

From the foregoing, it is clear that when considered in its most essential aspect, the modular AMI/AMR in-ground meter box of the present invention necessarily includes only first and second side panels, each having an interior side and an exterior side; and first and second end panels, each having an interior side and an exterior side, wherein each of the side panels and end panels include a generally rectangular planar portion having a top edge, a bottom edge, a first interlocking end having a plurality of interlocking male and female features, an arcuate second end having a 90-degree bend forming a corner of the assembled meter box and terminating in a second interlocking end having a plurality of male and female features configured to selectively mate and interlock with paired male and female slots in the first interlocking end of an adjoining side and end panels. Box assembly and dismantling are simple and fast when uninstalled, requiring merely alignment of the interlocking panels and the delivery of a sharp blow with a fist or mallet. When installed in ground, however, the meter box is virtually indestructible and is impenetrable to a degree suited for its use. The box panels are urged more tightly into their joined positions by compacting and moving soils and will not migrate in ground because of their exterior surface features. Thus, they will minimize stress on service pipes and conduits coupled to AMI/AMR equipment installed on brackets in the box. They will prevent intrusion and damage from burrowing animals and will withstand overhead forces imparted by vehicles and other heavy loads. Configured with integral arcuate corners to withstand extraordinary loads and never to come apart unintentionally, storage, packaging and shipment of the boxes are nonetheless facilitated by panel stacking and uniform component sizing. In short, they represent a notable advance over prior art underground meter boxes and are ideally adapted for large scale municipal utility projects.

Figures 6, 7:
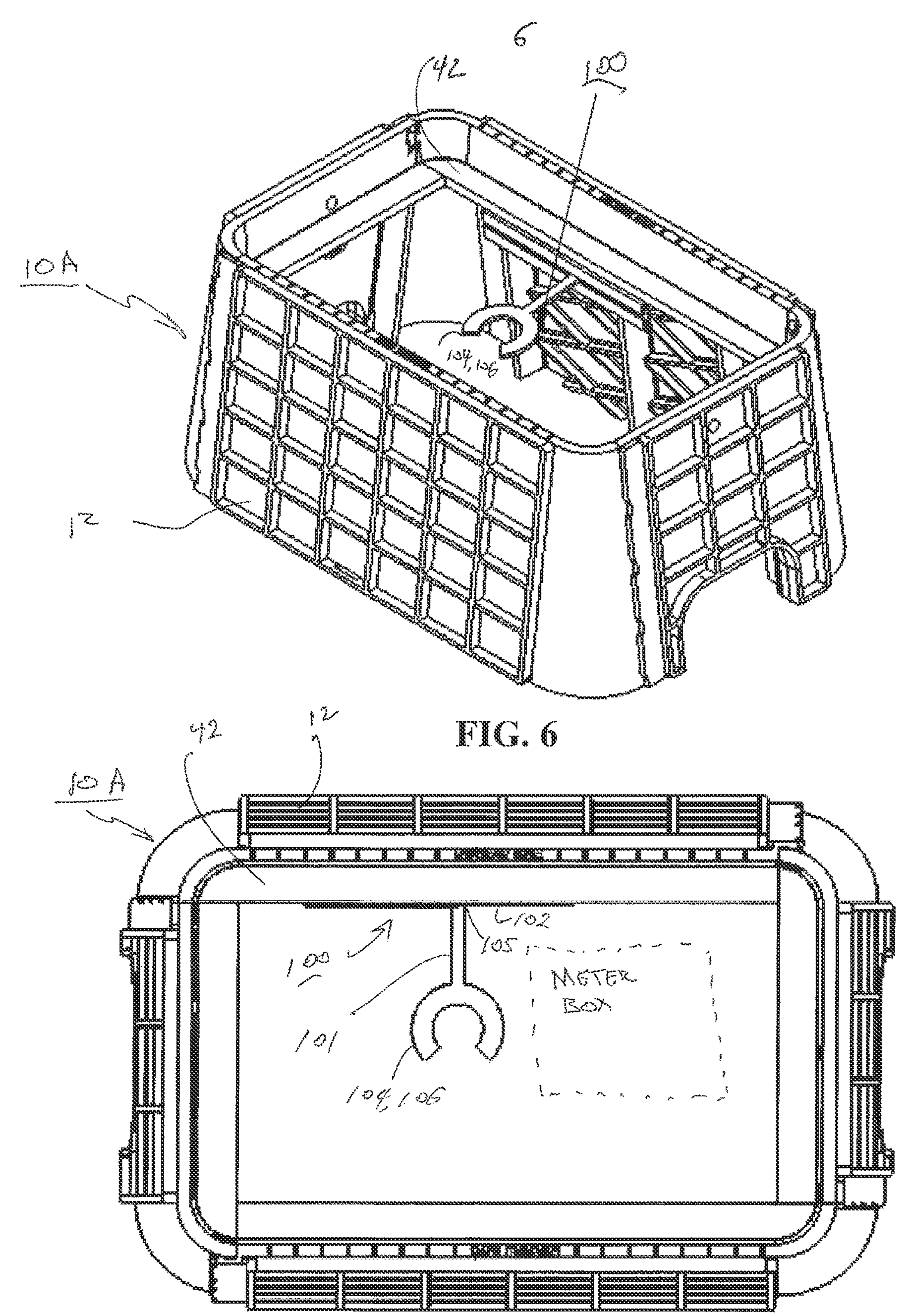
FIG. 6 is a perspective view of an enhanced embodiment of the modular AMR/AMI in-ground meter box of the present invention with an adjustable bracket and channel installed to support an endpoint away from a meter.
FIG. 7 is a top plan view of FIG. 6 noting relative optional locations of the adjustable bracket channel and a meter.
Figure 8:
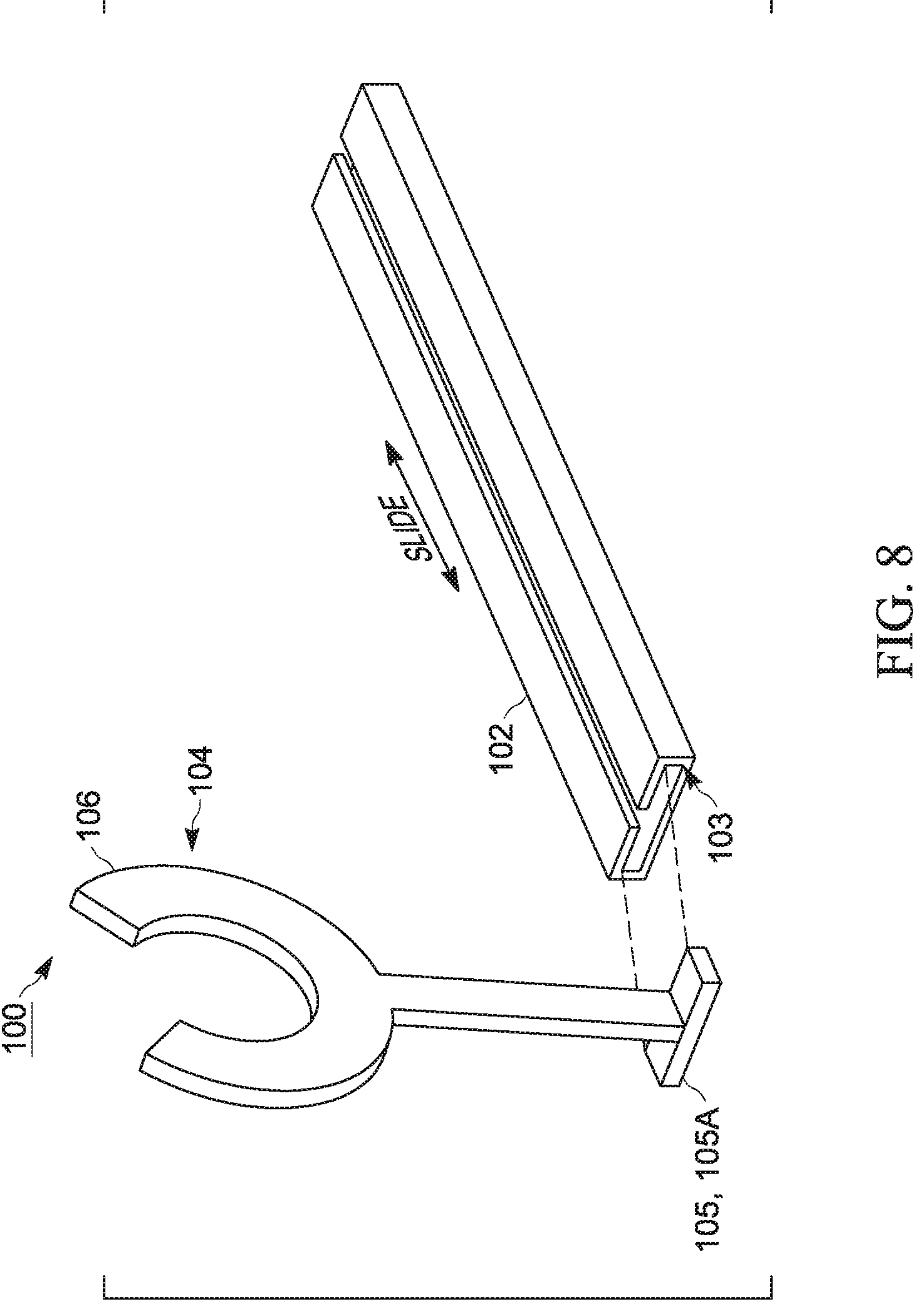
FIG. 8 is an exploded view of the adjustable bracket and channel according to one alternative embodiment of the present invention.

Additionally referring now to FIGS. 6 to 8 where a further improved modular AMR/AMI in-ground box 10A is provided. Improved modular box 10A is substantially the same and assembles the same as modular AMR/AMI in-ground box 10 as discussed above in FIGS. 1 to 5. As noted with relative call outs the interior support ledge or flange 42 is set below the top edge as shown.

An adjustable bracket channel assembly 100 is provided and includes an adjustable bracket member 101 that is slidably and adjustably received within a channel member 102. Adjustable bracket member 101 includes a free end 104 having a C-shaped member 106 opposite a support end 105 that is slidably retained within a slidable channel 103 of channel member 102.

Channel member 102 is affixed to the interior of AMR/AMI in-ground box 10A by any reasonable means known to the art, including, but not limited to epoxy and adhesives, threaded fasteners, snap-inter-fits with molded receivers (not shown but may be adaptively formed in the interior surface). Channel member 102 includes an interior portion and is shaped to receive a cross member 105A formed on support end 105 on adjustable bracket member 101 opposite free end 104.

As shown, cross member 105A is slidable along slidable channel 103 so as to position C-shaped member 106 relative to meter box (shown in FIG. 7) within the interior of box 10A. In this manner, the adjustable bracket channel assembly 100 allows an end point of a service linkage to be positioned suitable away from or closer to the meter box in the ground. This arrangement provides an improved convenience during operation and later maintenance or adjustment; as well as an improved safety to support the connections and minimize stress on connection points and linkages, minimizing unintended separation, breakage, and damage.

As a further enhancement of the proposed invention, it will be understood that more than one adjustable bracke member 101 or channel member 102 (or the assembly 100) may be positioned in multiple places within the interior of box 10A, without departing from the scope and spirit of the present invention.

The disclosure herein is sufficient to enable those with skill in the relevant art to practice the invention without undue experimentation. The disclosure further provides the best mode of practicing the invention now contemplated by the inventor.

While the particular meter box herein shown and disclosed in detail is fully capable of attaining the objects and providing the advantages stated herein, it is to be understood that it is merely illustrative of the presently preferred embodiment of the invention and that no limitations are intended to the detail of construction or design herein shown other than as defined in the appended claims. Accordingly, the proper scope of the present invention should be determined only by the broadest interpretation of the appended claims so as to encompass all such modifications as well as all relationships equivalent to those illustrated in the drawings and described in the specification.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by a material amount while still staying within the teachings of the present application, unless some different range is specifically mentioned. Where a specified logical step is used, the opposite logical steps are also intended to be encompassed.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. An AMI/AMR in-ground meter box assembly, comprising:

first and second side panels, each having an interior side and an exterior side; and first and second end panels, each having an interior side and an exterior side;

wherein each of said side panels and end panels include a generally rectangular planar portion having a top edge, a bottom edge, a first interlocking end having a plurality of male elements and female slots forming the first interlocking end having a half-blind vertical edge, an arcuate second end having a 90-degree bend which forms a corner of the assembled meter box and terminating in a second interlocking end having a plurality of male elements and female slots configured to interlock with paired male elements and female slots in a first interlocking end of an adjoining side or end panel; and at least a first adjustable bracket channel assembly mounted in the interior side of the first side panel of the assembled meter box assembly.

2. The AMI/AMR in-ground meter box assembly, according to claim 1, wherein:

said at least first adjustable bracket channel assembly includes a channel member defining a slidable channel and an adjustable bracket member having a free support first end and a support second end removably and adjustable retained within said slidable channel.

3. The AMI/AMR in-ground meter box assembly, according to claim 2, wherein:

said channel member is mounted to said interior of said assembled meter box assembly and has an extending length along said slidable channel.

4. The AMI/AMR in-ground meter box assembly, according to claim 3, wherein:

said free support end of said adjustable bracket member including a C-shaped member having an open side; and said open side facing away from said channel member.

5. The AMI/AMR in-ground meter box assembly of claim 4, wherein:

said support second end of said adjustable bracket member includes cross member having an engaging profile shaped for slidable engagement with said slidable channel of said channel member, whereby said support second is slidably adjustable along said extending length allowing a relative positioning of said free support end of said adjustable bracket member within said interior of said assembled meter box assembly.

6. An AMI/AMR in-ground meter box assembly, comprising:

first and second side panels, each having an interior side and an exterior side; and first and second end panels, each having an interior side and an exterior side;

wherein each of said side panels and end panels include a planar portion having a top edge, a bottom edge, a first interlocking end having a plurality of male elements and female slots forming the first interlocking end having a vertical edge, an arcuate second end which forms a corner of the assembled meter box and terminating in a second interlocking end having a plurality of male elements and female slots configured to interlock with paired male elements and female slots in a first interlocking end of an adjoining side or end panel; and at least a first adjustable bracket channel assembly mounted in an interior of the assembled meter box assembly; and wherein said at least first adjustable bracket channel assembly includes a channel member defining a slidable channel and an adjustable bracket member having a free support first end and a support second end removably and adjustable retained within said slidable channel.

7. The AMI/AMR in-ground meter box assembly, according to claim 6, wherein:

said channel member is mounted to said interior of said assembled meter box assembly and has an extending length along said slidable channel.

8. The AMI/AMR in-ground meter box assembly, according to claim 6, wherein:

said free support end of said adjustable bracket member including a C-shaped member having an open side; and said open side facing away from said channel member.

9. The AMI/AMR in-ground meter box assembly of claim 6, wherein:

said support second end of said adjustable bracket member includes cross member having an engaging profile shaped for slidable engagement with said slidable channel of said channel member, whereby said support second is slidably adjustable along said extending length allowing a relative positioning of said free support end of said adjustable bracket member within said interior of said assembled meter box assembly.

10. The AMI/AMR in-ground meter box assembly of claim 6, wherein the channel member is affixed to the interior of the assembled meter box assembly using an epoxy or an adhesive.

11. The AMI/AMR in-ground meter box assembly of claim 6, wherein the channel member is affixed to the interior of the assembled meter box assembly using a threaded fastener.

12. The AMI/AMR in-ground meter box assembly of claim 6, wherein the channel member is integrally molded to the interior of the assembled meter box assembly.

13. An AMI/AMR in-ground meter box assembly, comprising:

first and second side panels, each having an interior side and an exterior side; and first and second end panels, each having an interior side and an exterior side;

wherein each of said side panels and end panels include a planar portion having a top edge, a bottom edge, a first interlocking end having a plurality of male elements and female slots forming the first interlocking end having a vertical edge, an arcuate second end which forms a corner of the assembled meter box and terminating in a second interlocking end having a plurality of male elements and female slots configured to interlock with paired male elements and female slots in a first interlocking end of an adjoining side or end panel; and at least a first adjustable bracket channel assembly mounted in an interior of the assembled meter box assembly; and wherein said at least first adjustable bracket channel assembly includes an adjustable bracket member having a free support first end with a C shape and a support second end movably coupled to the interior side of the first side panel.

14. The AMI/AMR in-ground meter box assembly, according to claim 13, wherein:

said at least first adjustable bracket channel assembly further includes a channel member directly coupled to the interior side of the first side panel; and said channel member is mounted to said interior of said assembled meter box assembly and has an extending length along said slidable channel.

15. The AMI/AMR in-ground meter box assembly of claim 14, wherein the channel member is affixed to the interior of the assembled meter box assembly using an epoxy or an adhesive.

16. The AMI/AMR in-ground meter box assembly of claim 14, wherein the channel member is affixed to the interior of the assembled meter box assembly using a threaded fastener.

17. The AMI/AMR in-ground meter box assembly of claim 14, wherein the channel member is integrally molded to the interior of the assembled meter box assembly.

18. The AMI/AMR in-ground meter box assembly, according to claim 14, wherein:

said free support end of said adjustable bracket member including a C-shaped member having an open side; and said open side facing away from said channel member.

19. The AMI/AMR in-ground meter box assembly of claim 14, wherein:

said support second end of said adjustable bracket member includes cross member having an engaging profile shaped for slidable engagement with said slidable channel of said channel member, whereby said support second is slidably adjustable along said extending length allowing a relative positioning of said free support end of said adjustable bracket member within said interior of said assembled meter box assembly.

* * * * *